Patented June 27, 1950

2,513,090

UNITED STATES PATENT OFFICE 2,513,090

PREPARATION OF UNSATURATED ESTERS

Harry de V. Finch, El Cerrito, and Elbert A. Peterson, Berkeley, Calif., assignors to Shell Development Company, San Francisco, Calif., a corporation of Delaware No Drawing. Application December 7, 1946, Serial No. 714,898

16 Claims. (Cl. 260—494)

This invention relates to a method of preparing diesters of the unsaturated aldehydes such as the 1,1-diacyloxy-2-alkenes obtainable by reaction of an unsaturated aldehyde with a carboxylic acid anhydride. The invention comprises, more particularly, the preparation of such diacyloxyalkenes in an improved manner by a process wherein the reactants are employed in the vapor state, in the presence of a catalyst in the solid state and under effective conditions of reaction as hereinafter described.

The diacyloxyalkenes with which the present invention is concerned are those organic compounds having structures corresponding to the structural formula

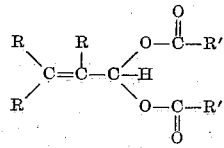

wherein each R represents one of the class consisting of the hydrogen atom and organic radicals, and each R' represents an organic radical. The organic radicals that may be represented by R and R' preferably are alkyl groups but in the broader aspects of the invention they are not limited thereto. The compounds within this class of compounds, because of the presence in the molecule of the carbon-to-carbon multiple bond and the two ester groups attached to a common carbon atom, have considerable utility and value, particularly as chemical intermediates for the preparation of various derived organic compounds. As representative examples of compounds within this class, there may be mentioned the acyclic esters 1,1-diacetoxy-2-propene, 1,1-dipropionoxy-2-propene, 1-acetoxy-1-propionoxy-2-propene, 1,1-diacetoxy-2-propene, 1,1-dibutyroxy-2-methyl-2-propene, 1,1-diisobutyroxy-2-butene, 1,1-dipropionoxy-2-butene, 1,1-diacetoxy-2-methyl-2-butene, 1,1-diisopropionoxy-2-ethyl-2-butene, and homologous and analogous compounds. 1,1-diacyloxy-2-alkenes containing a cyclic grouping of atoms and/or a plurality of carbon-to-carbon multiple bonds comprise, for example, 1,1-diacetoxy-3-phenyl-2-propene, 1,1-dibenzoxy-2-methyl-2-propene, 1-acetoxy-1-benzoxy-3-methyl-2-butene, 1,1-diacetoxy-2-cyclohexyl-2-propene, and homologous and analogous compounds.

The present invention relates in particular to a process of preparing 1,1-diacyloxy-2-alkenes by reaction of an alpha,beta-unsaturated aldehyde and a carboxylic acid anhydride, effected with the reactants in the vapor phase and in the presence of a suitable solid catalyst according to the equation

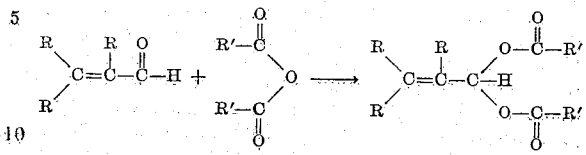

wherein R and R' have their previous significance.

The process of the present invention is executed by contacting a gaseous reaction mixture comprising an alpha,beta-unsaturated aldehyde and a carboxylic acid anhydride, both the aldehyde and the anhydride being capable of being brought into the vapor state under the conditions employed, with a solid catalyst that is effective in promoting the desired reaction, and under suitable conditions of reaction temperature, proportions of reactants, time of contact of the reaction mixture with the catalyst, and the like. The aldehydes that may be employed in accordance with the invention comprise the alpha,beta-unsaturated aldehydes having the structure

wherein R represents one of the class consisting of the hydrogen atom and organic groups such as alkyl, aryl, alkaryl, aralkyl, alkenyl, aralkenyl, alkenaryl, cycloalkyl, cycloalkenyl, heterocyclic groups, and the like, and in which the organic groups may consist solely of carbon and hydrogen atoms, or may contain in addition thereto atoms of elements other than carbon and hydrogen, provided such additional atoms are not of a kind or in a position in the molecule to split off, or to affect adversely or to react undesirably with the catalyst, or to cause undesired side reactions, or in any other way to prevent the successful execution of the process of the invention. Among the elements other than carbon and hydrogen which thus may be present are, for example, oxygen, as in alkoxy, aryloxy, and similar groups, or in ester groups, etc., nitrogen atoms as in amine groups, halogen atoms, such as chlorine, iodine, bromine, etc., phosphorus atoms, sulfur atoms, etc. It has been found to be generally desirable to employ in the present process those aldehydes wherein the organic groups that may be represented by R are relatively non-reactive, such as those groups which contain only saturated carbonto-carbon bonds or aromatic carbon-to-carbon multiple bonds, such as alkyl, aryl, aralkyl, alkaryl, cycloalkyl, and the like, specific examples of organic groups within this more limited class including, among others, methyl, ethyl propyl, isopropyl, butyl, phenyl, tolyl, xylyl, cyclohexyl, cyclopentyl, etc. Particularly favorable results may be obtained when R represents either hydrogen or an alkyl group, i. e., when acyclic aldehydes corresponding to the foregoing formula and containing only one carbon-to-carbon multiple bond are utilized.

The carboxylic acid anhydride,

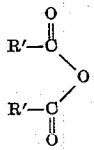

may be either cyclic or acyclic, and the two groups represented by R' may be either the same or different, or they may be united to form a cyclic group, as in the anhydrides of cyclic polycarboxylic acids or in the cyclic anhydrides of acyclic polycarboxylic acids. It frequently is most convenient and desirable to employ an anhydride of a fatty acid, or the mixed anhydride of two fatty acids as the carboxylic acid anhydride in the present process, although other anhydrides, such as benzoic anhydride, phthalic anhydride, maleic anhydride, etc., also may be used with advantage.

Specific examples of unsaturated aldehydes and carboxylic acid anhydrides which thus may be employed in the process of the present invention are acrolein and acetic anhydride to form 1,1-diacetoxy-2-propene, methacrolein and propionic anhydride to form 1,1-dipropionoxy-2-methyl-2-propene, crotonaldehyde and acetic-propionic anhydride to form 1-acetoxy-1-propionoxy-2-butene, acrolein and butyric anhydride to form 1,1-dibutyroxy-2-propene, alpha,beta-dimethylcrotonaldehyde and acetic anhydride to form 1,1-diacetoxy-2,3-dimethyl-2-butene, gamma-chlorocrotonaldehyde and benzoic anhydride to form 1,1-dibenzoxy-4-chloro-2-butene, and similar combinations of the specifically mentioned or of analogous and homologous aldehydes and carboxylic acid anhydrides.

The unsaturated aldehyde and the carboxylic acid anhydride that are used in the present process may have at the pressure employed a boiling point below the reaction temperature used in the process, or either or both may have a boiling point higher than the temperature employed, provided the reactants have sufficient vapor pressure, from either the liquid or solid state, to maintain under the conditions employed the requisite concentration in the gaseous mixture. Either or both of the reactants thus may have a vapor pressure at the temperature employed in the process of, say, down to about 150 millimeters of mercury or less, although the process generally may be executed more efficaciously when each of the reactants has a vapor pressure in excess of about 300 millimeters of mercury at the temperature employed. The process is most conveniently and advantageously executed, however, when there are employed reactants both of which have boiling points lower than the temperature of the gaseous reaction mixture at the pressure employed.

As the catalyst in the process of the present invention, there preferably is employed a solid mixture comprising a strong, substantially non-volatile mineral acid such as sulfuric acid or a phosphoric acid, adsorbed upon or otherwise carried by a solid, supporting material that preferably is a mineral material and that desirably is inert with respect both to the reactants and to the products of the reaction. Representative mineral supporting materials include, for example, alumina, kieselguhr, pumice, asbestos, zeolites, either natural or synthetic, clays or claylike materials and similar mineral materials which may be either naturally occurring mineral materials or synthetic mineral materials.

The solid catalysts suitable for use in the present process may be prepared in various ways, depending upon the nature of the supporting mineral material, the particular physical form in which it is desired to obtain the catalyst, and the like. In some cases, for example, an effective catalyst may be prepared by treating or impregnating preformed supporting material, such as an alumina, or silica or a siliceous material, which preferably is in a highly porous state such as a gel, with the non-volatile mineral acid in a liquid form, as in aqueous solution, in an amount sufficient to substantially saturate the supporting material. The treated support then may be heated, for example to 100° C. to 225° C., more or less, to drive off the water and to leave the mineral acid on the surface and within the pores of the mineral support. In other cases the catalyst may be prepared by mixing solid materials, one of which is decomposable by heat to form a strong substantially non-volatile mineral acid, forming or shaping the mixture, with the aid of a binder material if desired, and subsequently heating the mixture to produce in situ the strong mineral acid.

Absorptive and/or adsorptive supporting materials, such as various aluminas or siliceous materials, frequently may be treated directly with a liquid, substantially anhydrous non-volatile mineral acid, e. g., sulfuric acid, as by immersing the supporting material therein or by spraying the acid onto the supporting material. Any excess acid present may be allowed to drain off, and the solid catalyst thus prepared employed without further treatment in the process of the invention.

In place of the solid catalyst comprising a solid supporting material and the non-volatile mineral acid, there may be employed acid-reacting substances which remain solid at the temperature of reaction, such as acid reacting salts, e. g., sodium acid sulfate, zinc chloride, etc. The salt may be supported or mixed with a supporting material such as the foregoing or, if desired, the catalyst may consist solely of the acid salt.

It has been found that the efficiency of the process is determined in part by the particular catalyst that is employed, and that within the broad class of solid catalysts above described, certain of the catalysts may be employed more efficaciously than others. It has been found that those catalysts known to the art as "solid phosphoric acid" catalysts and which in certain cases are commercially available in prepared form may be employed in the present process with particular advantage. Catalysts of this type comprise a calcined mixture of a phosphoric acid such as orthophosphoric acid and a solid adsorbent material, the phosphoric acid being present in variable amounts but generally in a preponderant amount such as from about 55 to about 75 per cent by weight of phosphoric acid expressed as $P_2O_5$, the balance being the supporting material along with minor amounts of incidental ingredients such as, for example, water, mineral impurities, and the like. The supporting material preferably is a silicious material, such as silica in its various possible forms, as diatomaceous earth, kieselguhr, infusorial earth, tripolite, artificially prepared porous silica; or silicates such as the aluminum silicates naturally occurring as in bentonite, or as in zeolites, natural or synthetic, clays or acid treated clays, or the like. The solid phosphoric acid catalysts that may be employed in the present process, may contain in addition to the phosphoric acid, the supporting material, and the incidental ingredients as above mentioned, minor amounts of other materials such as carbonaceous or other binders to increase the mechanical strength of the catalyst, and the like.

Solid phosphoric acid catalysts of a type suitable for use in the present process may be prepared by mixing the supporting, or silicious, material with a liquid phosphoric acid such as liquid othophosphoric acid containing from about 60 to about 100 per cent $H_3PO_4$, in proportions sufficient to provide the desired amount of the acid in the final product, and then by heating, or calcining, the resultant mixture at an elevated temperature, preferably from about 200 to about 300° C., to render it solid, and then grinding, pelleting, or otherwise mechanically treating the solid product to obtain it in the desired physical form. The mixing of the acid and the supporting material may be carried out most effectively at an elevated temperature, but preferably below the temperatures employed for heating, or calcining, the mixture.

When the term "solid phosphoric acid catalyst" is used in the present specification and/or the appended claims, it will be understood to refer to a mixture comprising a phosphoric acid and a solid siliceous supporting material that has been heated, or calcined, to an extent sufficient to render the mixture solid.

The catalyst may be employed in the present process in any suitable physical form, as rods, pellets, briquettes, or other formed shapes of cylindrical, spherical, or other contour, or in the form of fragments, particles, or other irregularly shaped pieces.

The process of the present invention may be executed in either a batchwise, intermittent, or continuous manner, although it is particularly suited to a continuous manner of operation. When the process is to be carried out in a continuous manner, it is most effectively executed by volatilizing separately the two reactants, continuously mixing the vapors, and continuously passing the mixed vapors into contact with the catalyst positioned in a suitable reaction tube or vessel, and separating from the mixture after such contact the 1,1-diacyloxy-2-alkene and any excess or unreacted reactants that it may be desired to recover.

The reactants may be employed with either one present in molar excess in the gaseous reaction mixture, proportions from about 0.2 to about 5 moles of the carboxylic acid anhydride per mole of the unsaturated aldehyde being generally suitable. It generally is most convenient, however, to employ the reactants in substantially equimolar amounts. The reactants in the stated proportions may, if desired, constitute in its entirety the gaseous reaction mixture. In other cases, however, as when relatively less volatile reactants are employed, an inert diluent gas, such as nitrogen, an inert hydrocarbon, etc., may be included in the reaction mixture.

The temperature at which the reaction is to be effected depends in part upon the particular reactants that are involved, in part upon the particular catalyst that is employed, and in part upon the other conditions of the reaction. Excessively low temperatures tend to reduce the yield of the desired reaction product, whereas at excessively high temperatures there may occur undesirable decomposition of either or both of the reactants or of the product of reaction. The temperature should be at least sufficiently high to maintain adequate amounts of the reactants in the vapor state, the temperature preferably being in excess of about 150° C. Temperatures as high as 350° C. or higher may be employed at times, although it frequently is desirable to avoid the use of temperatures above about 275° C. In general, optimum results are obtained when the reaction temperature, i. e., the temperature of the catalyst mass, is maintained at from about 150° C. to about 250° C.

The time of contact of the mixture with the catalyst most suited to provide optimum results, is determined by the temperature employed, the specific nature of the reactants and the catalyst, and by similar considerations. Excessively long times of contact between the gaseous reaction mixture and the catalyst, e. g., in the case of continuous operations, excessively low rates of flow of the reaction mixture through the catalyst chamber, tend to promote the deposition of carbonaceous deposits upon the catalyst surfaces and hence tend to reduce the efficiency of the process as a whole. Excessively short times of contact tend to reduce the overall conversion due to the limitation imposed upon the time during which the reaction may take place. When the process is executed in a continuous manner, rates of flow of the reactants through the catalyst chamber corresponding to from about 0.01 to about 0.5 total moles of reactants per 100 cc. of catalyst per minute may be employed effectively, although the use of higher or of lower rates of flow is not necessarily precluded. When acrolein and acetic anhydride have been reacted over a solid phosphoric acid catalyst, for example, particularly favorable results have been obtained utilizing equimolar proportions of reactants, a reaction temperature of about 200° C., and a flow rate of about 0.15 total moles of reactants per 100 cc. of catalyst per minute.

The process may be carried out at either atmospheric pressures, or at pressures either above or below atmospheric pressures, subject, of course, to the obvious limitations imposed upon the use of superatmospheric pressures by the necessity of maintaining a sufficient concentration of the reactants in the gaseous state at the temperatures employed. It generally is most convenient to employ pressures about atmospheric. Advantages may at times be gained, as in the case of reactants boiling under atmospheric pressures at temperatures in excess of the reaction temperature, through the use of subatmospheric pressures to facilitate or to enable sufficient volatilization of the reactants.

The process of the present invention is not limited as to the type of apparatus that may be employed, and many suitable types will be apparent to those skilled in the art. One suitable type of apparatus adapted to continuous operations comprises an elongated reaction tube constructed of steel, glass, porcelain, etc., within which a bed of the catalyst may be positioned and which is surrounded by a suitable heating means such as heating coils, electrical heaters, conduits for hot gases, etc. The reactants may be volatilized and a stream of the mixed vapors passed through the reaction tube containing the catalyst under the herein described conditions of reaction. Upon egress of the reaction mixture from the reaction tube, the mixture may be cooled so as to render it liquid, and allowed to accumulate, or it may be separated directly into its several components, as by fractional condensation or in any other suitable manner.

The following examples will illustrate certain specific embodiments of the present invention as it has been applied to the preparation of 1,1-diacetoxy-2-propene by the reaction of acrolein with acetic anhydride. It will be appreciated that variations in the present invention other than the specific examples presented may be made without exceeding the letter and the spirit of the invention as it is defined in the appended claims.

EXAMPLES

In each of the following experiments, the conditions and results of which are described in the following table, there was employed a steel reaction tube having an internal diameter of about ¾ inch and filled throughout about 2 feet of its length with a bed of the catalyst identified in the table. The temperature of the catalyst was measured by a thermocouple positioned in a thermocouple well having an external diameter of ¼ inch and extending coaxially the length of the reaction tube. The reaction tube was provided with externally located electrical heaters by which it was maintained at the desired temperature. Suitable vaporizers at the inlet end of the reaction tube provided for volatilization and introduction of the reactants into the tube at controlled rates. A water-cooled condenser was located at the exit end of the reaction tube, wherein the gaseous mixture leaving the tube was cooled to about room temperature and materials thereby liquified, separated.

In each experiment given in the table, a fresh portion of the catalyst was used. Acrolein and acetic anhydride were volatilized separately and passed through the reaction tube in equimolar quantities at the rate of flow and temperature indicated in the table. Atmospheric pressures were employed. The gaseous mixture leaving the tube was cooled, and at the conclusion of each experiment the mixture thus obtained was distilled under reduced pressure to recover the 1,1-diacyloxy-2-propene.

We claim as our invention:

1. A method of preparing 1,1-diacetoxy-2-propene which comprises passing a gaseous reaction mixture comprising acrolein and acetic anhydride into contact with a solid catalyst consisting essentially of a calcined mixture of ortho phosphoric acid and a solid absorbent siliceous material maintained at a temperature between about 150° C. and about 250° C.

2. A method of preparing 1,1-diacetoxy-2-methyl-2-propene which comprises passing a gaseous reaction mixture comprising methacrolein and acetic anhydride into contact with a solid catalyst consisting essentially of a calcined mixture of ortho phosphoric acid and a solid absorbent siliceous material maintained at a temperature between about 150° C. and about 250° C.

3. A method of preparing 1,1-diacetoxy-2-butene which comprises passing a gaseous reaction mixture comprising crotonaldehyde and acetic anhydride into contact with a solid catalyst consisting essentially of a calcined mixture of ortho phosphoric acid and a solid absorbent siliceous material maintained at a temperature between about 150° C. and about 250° C.

4. A method of preparing 1,1-diacetoxy-2-propene which comprises passing a gaseous stream comprising the vapors of acetic anhydride and acrolein in substantially equimolar proportions into contact with a solid catalyst consisting essentially of a calcined mixture of a phosphoric acid and a solid absorbent siliceous material maintained at a reaction temperature from about 150° C. to about 250° C. at a rate of flow of from about 0.01 to about 0.5 moles of reactants per 100 cc. of catalyst per minute.

5. A method of preparing a 1,1-diacyloxy-2-alkene which comprises passing a gaseous stream comprising the vapors of an acyclic alpha, beta-olefinic aldehyde containing not more than the one carbon-to-carbon multiple bond and of a volatile, aliphatic, carboxylic acid anhydride in substantially equimolar proportions into contact with a solid catalyst consisting essentially of a calcined mixture of a phosphoric acid and an inert solid, absorbent mineral material maintained at a temperature between about 150° C. and about 350° C. at a rate of flow of from about 0.01 to about 0.5 moles of reactants per 100 cc. of catalyst per minute.

6. A method of preparing a 1,1-diacyloxy-2-alkene which comprises passing a gaseous stream comprising the vapors of an acyclic alpha,beta-olefinic aldehyde containing not more than the one carbon-to-carbon multiple bond and of a volatile, aliphatic, carboxylic acid anhydride in a molar proportion from about 1:5 to about 5:1 into contact with a solid catalyst consisting essentially of phosphoric acid supported on an inert solid absorbent siliceous material maintained at a temperature between about 150° C.

*Table*

| Catalyst | Temperature of Catalyst, °C. | Flow Rate (Total Moles Reactants per 100 cc. catalyst per minute) | Total Moles of Reactants | Conversion to 1,1-diacetoxy-2-propene (per cent) | Yield of 1,1-diacetoxy-2-propene (per cent on acrolein) |
|---|---|---|---|---|---|
| Solid phosphoric acid catalyst* | 200 | 0.074 | 3.74 | 53 | 68 |
| Do | 200 | .15 | 3.64 | 54 | 76 |
| Do | 270 | .013 | 3.46 | 16 | 22 |
| Do | 210 | .26 | 3.60 | 39 | 70 |
| Al₂O₃–H₂SO₄† | 160 | .024 | 3.20 | 4 | |

*Solid phosphoric acid catalyst sold commercially as "U. O. P. Phosphoric Acid Catalyst." The catalyst was employed in the form of cylinders having a diameter of about 3/16 inch and a length of about 3/16 inch.
†The catalyst in this experiment was prepared by immersing activated alumina in concentrated sulfuric acid (98%) and allowing the impregnated alumina to drain until free of excess acid.

and about 350° C. at a rate of flow of from about 0.01 to about 0.5 moles of reactants per 100 cc. of catalyst per minute.

7. A method of preparing 1,1-diacyloxy-2-propene which comprises passing a gaseous reaction mixture comprising acrolein and an aliphatic carboxylic acid anhydride into contact with a solid catalyst consisting essentially of a calcined mixture of ortho phosphoric acid and a solid absorbent siliceous material maintained at a temperature between about 150° C. and about 350° C.

8. A method of preparing a 1,1-diacyloxy-2-propene which comprises passing a gaseous reaction mixture comprising acrolein and a carboxylic acid anhydride into contact with a solid catalyst consisting essentially of phosphoric acid supported on an inert solid, absorbent mineral material maintained at a temperature between about 150° C. and about 350° C.

9. A method of preparing a 1,1-diacetoxy-2-alkene which comprises passing a gaseous reaction mixture comprising acetic anhydride and an acyclic alpha,beta-olefinic aldehyde containing not more than the one carbon-to-carbon multiple bond into contact with a solid catalyst consisting essentially of phosphoric acid supported on an inert solid, absorbent mineral material maintained at a temperature between about 150° C. and about 350° C.

10. A method of preparing a 1,1-diacyloxy-2-alkene which comprises passing a gaseous reaction mixture comprising an alpha,beta-olefinic aldehyde and a carboxylic acid anhydride into contact with a solid catalyst consisting essentially of a strong, non-volatile mineral acid supported on an inert solid, absorbent mineral material maintained at a temperature between about 150° C. and about 350° C.

11. A method of preparing 1,1-diacyloxy-2-propene which comprises passing a gaseous reaction mixture comprising acrolein and acetic anhydride into contact with a solid catalyst consisting essentially of a strong, non-volatile, mineral acid carried by an inert solid, absorbent mineral material at a temperature between about 150° C. and about 350° C.

12. A method of preparing 1,1-diacetoxy-2-propene which comprises passing a gaseous reaction mixture comprising acrolein and acetic anhydride into contact with a catalyst consisting essentially of a strong, non-volatile, mineral acid carried by a solid adsorbent siliceous material at a temperature between about 150° C. and about 350° C.

13. A method of preparing 1,1-diacetoxy-2-propene which comprises passing a gaseous reaction mixture comprising acrolein and acetic anhydride into contact with a catalyst consisting essentially of a strong, non-volatile, mineral acid carried by an inert solid, absorbent mineral material at a temperature between about 150° C. and about 350° C.

14. A method of preparing a 1,1-diacyloxy-2-propene which comprises passing a gaseous reaction mixture comprising an alpha,beta-olefinic aldehyde and a carboxylic acid anhydride into contact with a solid catalyst consisting essentially of a strong, non-volatile mineral acid carried by an inert solid, absorbent mineral material at a reaction temperature in excess of about 150° C.

15. A method of preparing a 1,1-diacyloxy-2-alkene which comprises passing a gaseous reaction mixture comprising an alpha,beta-olefinic aldehyde and a carboxylic acid anhydride into contact with a solid catalyst consisting essentially of a strong, non-volatile mineral acid, carried by an inert solid, absorbent mineral material at a temperature in excess of about 150° C.

16. A method of preparing a 1,1-diacyloxy-2-alkene which comprises passing a gaseous reaction mixture comprising an alpha,beta-olefinic aldehyde and a carboxylic acid anhydride into contact with a solid catalyst consisting essentially of an acid-reacting inorganic salt at a temperature between about 150° C. and about 350° C.

HARRY DE V. FINCH.
ELBERT A. PETERSON.

REFERENCES CITED

The following references are of record in the file of this patent:

UNITED STATES PATENTS

| Number | Name | Date |
|---|---|---|
| 2,312,193 | Richter | Feb. 23, 1943 |
| 2,393,740 | Brant et al. | Jan. 29, 1946 |